United States Patent [19]

Breth

[11] Patent Number: 5,505,226

[45] Date of Patent: Apr. 9, 1996

[54] RAISED ACTUATOR MOUNT

[76] Inventor: Newton R. Breth, 1030 Adams Circle #114, Boulder, Colo. 80303

[21] Appl. No.: 391,383

[22] Filed: Feb. 12, 1995

[51] Int. Cl.$^6$ ............................. F16K 27/08; F16K 31/00
[52] U.S. Cl. ........................... 137/377; 251/291; 137/382
[58] Field of Search ................................... 137/377, 382; 251/291

[56] References Cited

U.S. PATENT DOCUMENTS

| | | | |
|---|---|---|---|
| 3,958,592 | 5/1976 | Wells et al. | 251/291 |
| 4,630,445 | 12/1986 | Parker | 251/64 |
| 4,714,233 | 12/1987 | Oates | 251/291 |
| 5,288,052 | 2/1994 | Black et al. | 251/291 |

*Primary Examiner*—A. Michael Chambers

[57] ABSTRACT

A sturdy mount is provided between a valve body bonnet (38) and a actuator frame (21) to reduce the transfer of heat from a valve body (39) to a actuator frame (21). Holes (18) in legs (28 *a b c*) reduce heat transfer through legs (28 *a b c*). Heat shield (27) blocks radiant heat from a hot valve body from reaching the actuator frame (21) and also acts as a radiator of heat to the surrounding air. Bolt (30) is free to move through bushing (26) located in the center of heat shield (27). Jamb nut (24) and spring plate (23) am screwed on to the threaded end of bolt (30). Legs (28 *a b c*) are attached to heat shield (27) with welds (19) on one edge to allow legs (28 *a b c*) to be spread slightly when installing on valve body bonnet (38). Slots (17) in legs (28) snap in place around valve body bonnet (38) Hose clamp (29) pulls legs (28 *a b c*) tightly to the valve body bonnet (38) creating a sturdy mount for heat shield (27) and attached actuator mount (25). A actuator frame (21) is installed on actuator mount (25) with a set screw (22) The force of the piston located in actuator frame (21) on a application of air pressure to the actuator frame (21) presses down on spring plate (23) that is connected to the threaded end of bolt (30). The head of bolt (30) presses down on a valve stem (35) compressing a spring (37) closing off the fluid flowing through the valve body. Upon a release of air pressure from the actuator (21) Spring (37) pushes valve stem (35) up against the head of bolt (30) which spring plate (23) is attached. Spring plate (23) pushes up against the piston that is located in the actuator frame (21) returning it to its normal position and allowing fluid to flow through the valve body.

3 Claims, 3 Drawing Sheets

RAISED ACTUATOR MOUNT

BACKGROUND

1. Field of the Invention

This invention relates to pneumatic valve controls specifically to the reduction of heat tranfer from a hot valve body to a pneumatic valve actuator diaphragm.

2. Description of Prior Art

Many types of processes use pneumatic operated valves to control the flow of liquids and gases. The temperature of fluids controlled range from below 32 degrees f. as in brine service to 500 degrees f. or higher as in high pressure steam service. Many common processes using pneumatic control valves operate in the 45 degree f. to 450 degree f. range. The subject matter of my current invention relates to pneumatic actuated plug and seat valves operating in this range.

A modulating plug valve includes a body, with a plug and seat inside having a stem for raising and lowering the plug within the valve body. A passage inside the valve body allows fluid to flow through the valve when the plug is lifted off the valve seat using a attached valve stem and external spring assembly. A valve stem seal prevents fluid leakage from around the valve stem. A pneumatic actuator is used to close off the flow of fluid through the valve body. A pneumatic actuator includes a frame or housing to hold a flexible rubber diaphragm and a movable piston. The actuator mounts to the valve bonnet over the stem and spring assembly. Air pressure from a pneumatic source is applied to the top of the rubber diaphragm of the actuator which moves the piston down against the force of the spring and the force of the fluid pushing up on the plug and stem. As a higher air pressure is applied to the diaphragm the stem and attached plug moves down toward the seat until a full pneumatic pressure causes the plug to seal tight against the seat stopping fluid flow. Flow through the valve may be moudulated by controlling the air pressure to the actuator. Less air pressure= more flow. More air pressure=less flow.

It is often advantages to to mount the actuator close to the valve body to provide a low cost compact unit. At low fluid temperatures 45 degrees f. to 130 degrees f. these valve body and actuator combinations generally preform their function well, however their are several disavantages connected with their use when fluid and or ambiant air temperatures rise above 130 degrees f. Most aparent of these dissavantages is the close proxcimity of the valve body to the pneumatic actuator that contains the rubber diaphragm. A constant conduction of heat from the hot valve body to the rubber diaphragm through the actuator housing raises the temperature of the diaphragm. Radiant heat from the valve body raises the diaphragm temperature further. Pneumatic actuated plug valves are often used in areas that have high ambiant air temperatures such as a boiler room. These factors combine to greatly shorten the working life of the rubber diaphragm.

When diaphragm temperatures rise higher than 250 degrees f. sudden and unexpected diaphragm failure may result when the rubber diaphragm ruptures due to heat damage. This allows the valve stem to move to the full open position and the process or equipment being controlled by the valve to go out of control. This creates a dangerous condition to exist, cause damage or down time to equipment connected to the valve. Actuator Temperatures above 250 degrees f. require frequent diaphragm replacement to avoid costly equipment failure or process down time.

One way to lower actuator diaphragm temperatures is to replace the entire valve body and actuator with a special type of valve body and pneumatic actuator designed to operate at high fluid temperatures while protecting the valve actuator from excessive heat, however these valves have several significant draw backs.

One draw back is expense, special high temperature valves cost much more to manufacture than low temperature type valves, so much more as to cause some users to continue to use the lower priced pneumatic valves in high temperature applications creating hazardous conditions.

Another draw back is special high temperature valves are larger in size and in some cases would be difficult to install as expensive piping changes would be needed to accommodate its larger size. The expense of the new piping alone is often higher than the cost of a special high temperature valve.

This results in keeping the high maintanance pneumatic actuators in service as well as creating safety concerns.

OBJECTS AND ADVANTAGES

Accordingly, several objects and advantages of my invention are to provide a inexpensive, simple in design, easy to install raised actuator mount that allows inexpensive low temperature type pneumatic valves to be used safely in high temperature applications.

It is a further object of this invention to provide a raised actuator mount that significantly lowers conducted and radiant heat transfer from a valve body to a actuator. That produces a much longer pneumatic actuator diaphragm life and a safer overall valve operation.

Finally it is an object of this inventon to provide a raised actuator mount that may be stacked one on top of another as many times as needed to further provide a safe operating temperature of a actuator diaphragm.

Still further objects and advantages will become apparent from a consideration of the ensuing description and accompanying drawings.

REFERENCE NUMERALS

Numerals

Summary

Figure 1:
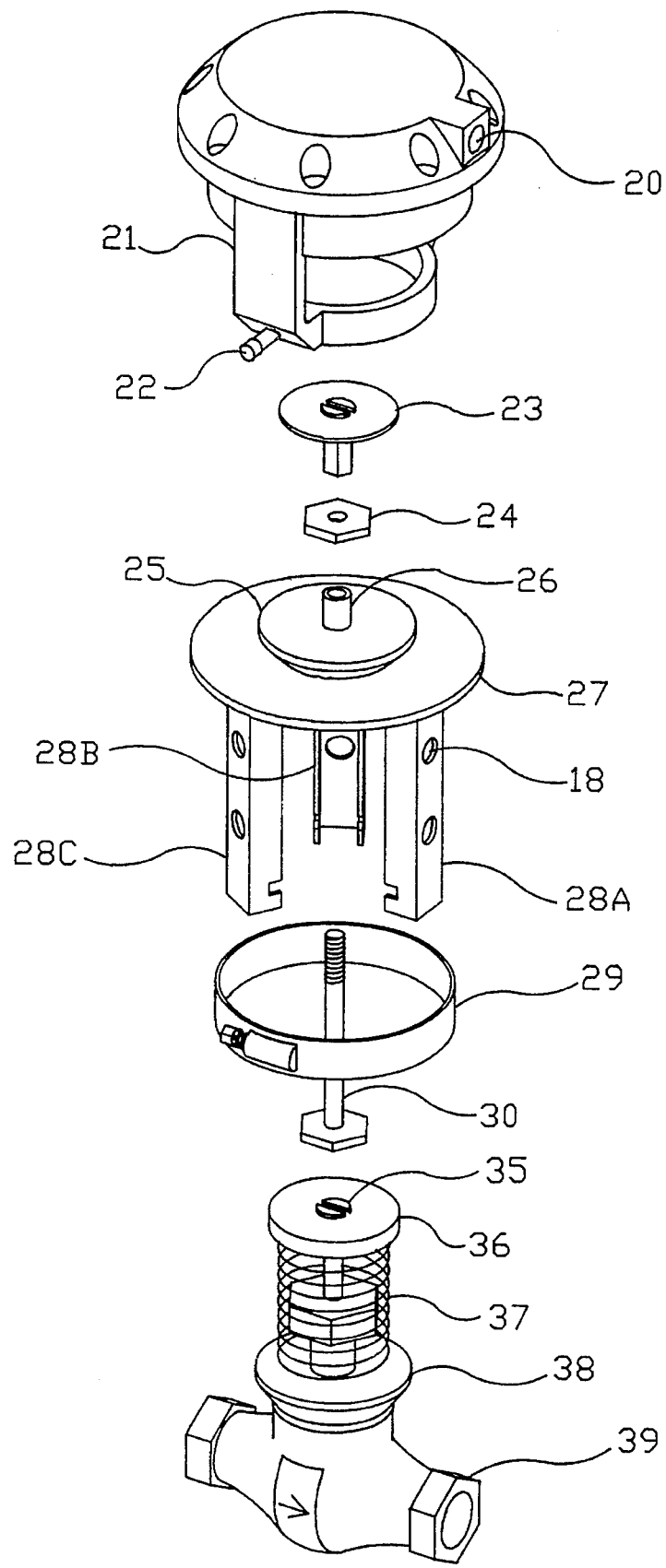
FIG. 1 shows an exploded view of the raised actuator mount used with an existing pneumatic actuator and valve body.

17. Slot
18. Hole

19. Weld
20. Air fitting
21. Actuator flame
22. Set screw
23. Spring plate
24. Jamb nut
25. Actuator mount
26. Bushing
27. Heat sheild
28. Legs a b c
29. Hose clamp
30. Bolt
35. Valve body stem
36. Spring cup
37. Spring
38. Valve body bonnet
39. Valve body

PREFERRED EMBODIMENT - DESCRIPTION

Refering to FIG. 1 there is depicted an actuator frame 21 which includes a rubber diaphragm a piston and a frame or housing. A air connection fitting 20, a set screw 22. These componets combine to form pneumatic a actuator assembly. These items are not part of the current invention but shown are shown for reference and illistration only.

Valve body 39 includes a valve stem 35, spring cup 36, a spring 37, and a valve body bonnet 38. These components combine to form a valve body assembly. These items are not part of the present invention but are shown for reference and illistration only.

The heat sheild 27 includes a bushing 26 that acts as a guide for bolt 30. Jamb nut 24 is screwed on to bolt 30. Spring plate 23 which includes a threaded adjustment hole at the bottom is also screwed on to bolt 30.

The heat sheild 27 also includes three legs 28 a b c with holes 18 to reduce heat transfer through the legs. Legs 28 a b c are welded to the heat sheild in such a way that allows the legs to be spread slightly in order to fit over the valve body bonnett 38 and snap in place around the rim of the valve body bonnet 38. Hose clamp 29 fits around legs 28 a b c at the valve bonnet 38 and using a screw driver is tightened securely, pulling legs 28 a b c tightly to the valve body bonnet.

The heat sheild 27 also includes a actuator mount 25. The pneumatic actuator frame 21 is attached to the actuator mount 25 with the tightening of set screw 22. Securely mounting the pneumatic actuator assembly to the raised acuator mount.

Adjustment plate 23, bolt 30 are adjusted and jamb nut 24 are then secured in place so as to allow bolt 30 to move freely through bushing 26.

The actuator piston that is housed in the actuator frame 21 on a air signal drives the valve body stem 35 down through the use of bolt 30 and adjustment plate 23.

Spring 37 returns the valve stem 35 and through the use of bolt 30, adjustment plate 23, the actuator piston housed in frame 21 to its normal position on a loss of air signal.

Figure 2:
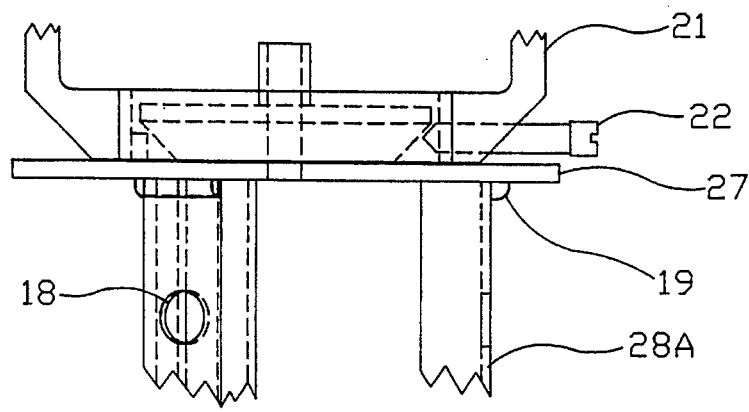
FIG. 2 is a is a side elevation view of the heat shield and attachments.

Reffering to FIG. 2 their is depicted a heat sheild 27, actuator mount 25, set screw 22, hole 18, weld 19, leg 28a, bushing 26.

The heat sheild 27 has three legs 28 a b c attached by three seperate welds 19. the weld is placed at the out side edge of each leg. This allows the legs 28 a b c to be spread outward slightly so that the three legs will snap over the valve bonnet 38 and yet still make a strong bond to the heat sheild 27. Holes 18 reduce the conduction of heat from the valve body through the legs to the heat sheild 27 and actuator mount 25.

Heat sheild 27 provides a barrier to radiant heat from the hot valve body to the actuator frame 21. Radiant heat from the hot valve body 39 strikes the under side of the heat sheild 27 and the heat sheild acts as a radiator to the sorounding air lowering the temperature of the actuator mount 25. Actuator mount 25 provides a mounting location for the pneumatic actuator frame 21. Set screw 22 secures the actuator 21 to the actuator mount 25. Bushing 26 acts as a guide for bolt 30 shown in FIG. 1.

Figure 3:
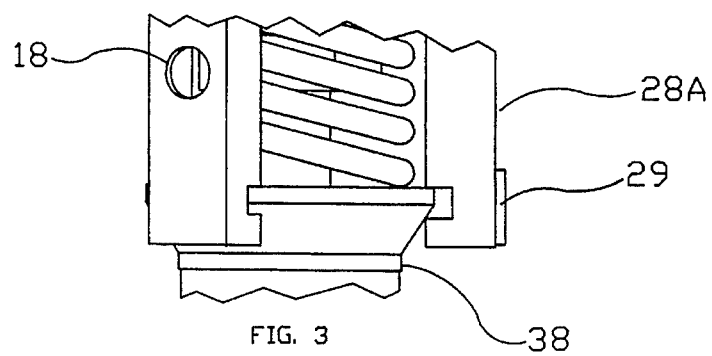
FIG. 3 shows a side elevation of the valve body bonnet and attachment of a leg.

Reffering to FIG. 3 Their is depicted a valve bonnet 38, hole 18, leg 28 a, hose clamp 29. The slot in legs 28 a b c allows a solid mount of the three legs to the valve body bonnet 38 with a minimum of contact area thus minimizing heat transfer from the valve body bonnet 38 to the three legs 28 a b c. A hose clamp 29 holds the three legs tight to valve body bonnet with a clamping action resulting in a sturdy assembly with twelve mounting points with a minimum of contact to the valve body bonnet.

Figure 4:
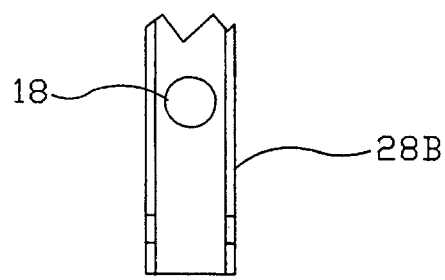
FIG. 4 is a side elevation view of the heat shield and attachments.

Reffering to FIG. 4 Their is depicted a leg 28a, hole 18, showing a side view of the slot and hole 18 in the leg.

Figure 5:
FIG. 5 is a end view of a leg.

Reffering to FIG. 5 Their is depicted a leg 28 showing a end view of a leg.

Figure 6:
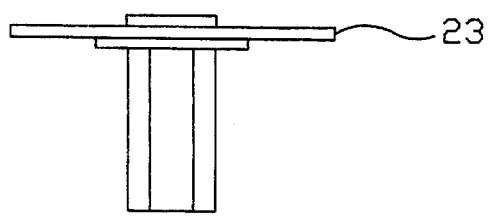
FIG. 6 is a side elevational view of the adjustment plate.

Reffering to FIG. 6 Their is depicted a side view of the adjustment plate 23 with a threaded hole at the bottom to receive bolt 30 shown in FIG. 1.

Figure 7:
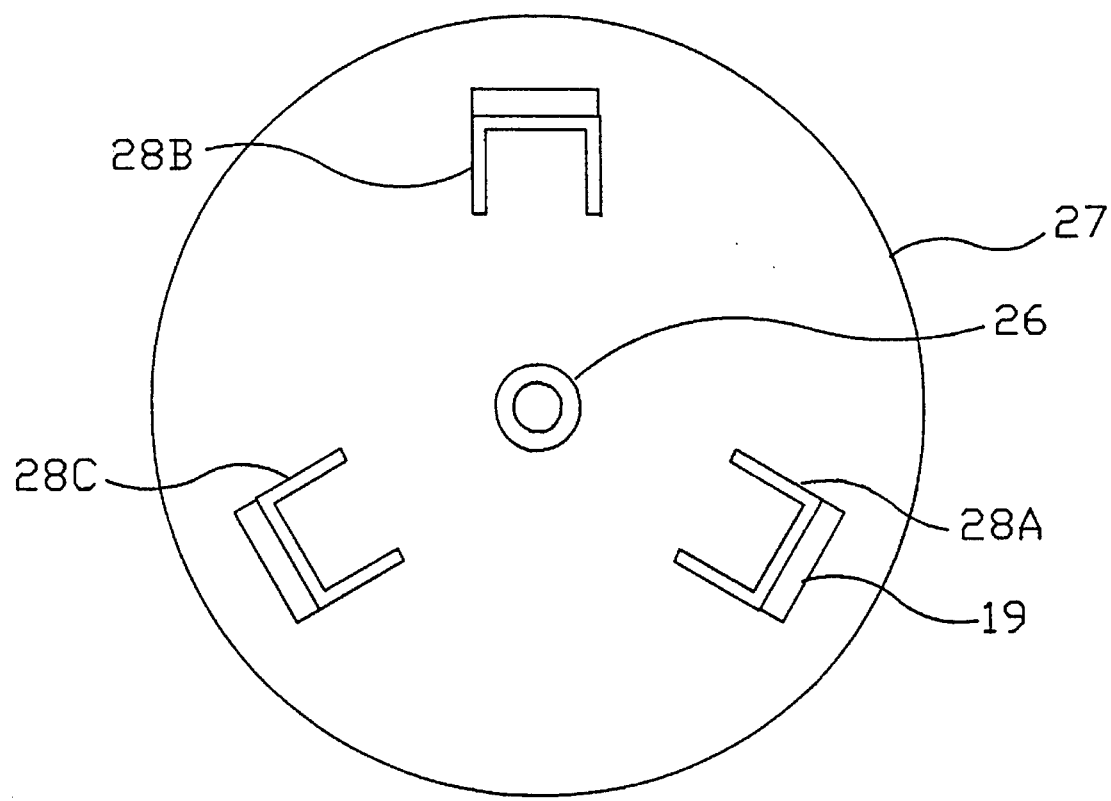
FIG. 7 shows a bottom view of the heat shield showing the attachment point of the legs.

Reffering to FIG. 7 Their is depicted a bottom view of the heat sheild 27, welds 19, bushing 26, legs 28 a b c, and their location.

Figure 8:
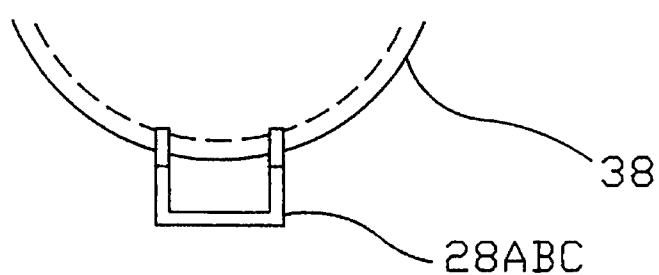
FIG. 8 is a bottom view of the valve body bonnet showing a leg contact point.

Reffering to FIG. 8 Their is depicted valve body bonnet 38, leg 28a, showing a bottom view of leg attachment to the valve body bonnet 38.

PREFERRED EMBODIMENT - OPERATION

The raised actuator mount functions effectively when installed on an existing low temperature type valve as follows: Remove actuator frame 21 from the valve body bonnet by loosening set screw 22 and lift actuator frame 21 up away from the valve body bonnet 38. Place actuator frame 21 aside.

Place the raised actuator mount legs 28 a b c down over the valve body assembly until leg slots 17 snap into place over the valve bonnet 38. Slide hose clamp 29 down to the bottom end of the legs and tighten securely.

Bolt 30, jamb nut 24, spring plate 23 have been previously installed in bushing 26 that is located in the heat sheild 27.

Place actuator frame 21 on to the actuator mount 25 and tighten set screw 22 securely.

The pneumatic valve assembly is now ready for normal operation with the raised actuator mount in place effectively lowering the pneumatic actuator diaphragm temperature.

Additional lowering of the pneumatic actuator diaphragm temperature may be obtained by simply stacking the raised actuator mounts one on top of another until required actuator diaphragm temperatures are obtained. No additional parts are required to perform this procedure.

To add another raised actuator mount to the valve body, remove actuator frame 21 from the first actuator mount 25 by loosening set screw 22. Set actuator frame 21 aside. Place the second raised actuator mount legs 28 *a b c* down over actuator mount 25 until leg slots 17 snap in to place over actuator mount 25. Slide hose clamp 29 down to the bottom end of the legs and tighten securely. Place actuator frame 21 on to the second actuator mount 25 and tighten set screw 22 securely.

The pneumatic valve assembly is now ready for normal operation with two raised actuator mounts in place further lowering the actuator diaphragm temperatures assuring long diaphragm life and safer over all valve operation.

CONCLUSIONS, RAMIFICATIONS, AND SCOPE

Accordingly, it can be seen that according to the invention, I have provided a inexpensive, sturdy, simple to install Raised Actuator Mount which provides a substantial decrease in conducted and radiated heat from a hot valve body to a pneumatic actuator diaphragm. A raised actuator mount that may be simply stacked one on top of another as many times as needed to provide an additional decrease in actuator diaphragm temperature while requiring no additional parts to do so. There by use of this invention allows low temperature type pneumatic valves to be used in high temperature applications with a great increase in safety and reduced equipment down time through longer actuator diaphragm life.

Although the description above contains many specificities, these should not be construed as limiting the scope of the invention but as merely providing illustrations of some of the presently preferred embodiments of this invention. Various other embodiments and ramifications are possible within it's scope. For example, Bolt 30. jamb nut 24, spring plate 23 may be installed at the factory through bushing 26 thus speeding the installation time of the raised actuator mount to the valve body. Pneumatic pilot positioners when needed may be used with the raised actuator mount with the use of a longer positioner spring. Fully enclosed type pneumatic actuator housings may also be used with the raised actuator mount with out any modification. Thus the scope of the invention should be determined by the appended claims and their legal equivalents, rather than by the examples given.

What is claimed is:

1. A mounting platform between a valve body and a actuator for reducing heat transfer, comprising:

three support members of equal length a weld joining the upper end of said support members to the under side of a metal plate so as to support said metal plate said metal plate contains a actuator mount on its upper side to support an actuator a hose clamp for locking slots of the lower end of said support members to a bonnet of a valve body said metal plate contains a bushing to guide a elongated member having a proximal end and a distal end.

2. A mounting platform as claimed in 1, wherein: a spring plate and locking nut is attached to the distal end of said elongated member.

3. A mounting platform as claimed in 1, wherein: said support members are attached to said metal plate in a manner that allows said support members to be spread out to fit over said bonnet of said valve body.

\* \* \* \* \*